(12) United States Patent
Matsunawa

(10) Patent No.: US 12,119,719 B1
(45) Date of Patent: Oct. 15, 2024

(54) RESOLVER AND SERVO MOTOR

(71) Applicant: MABUCHI MOTOR CO., LTD., Matsudo (JP)

(72) Inventor: Akira Matsunawa, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/688,325

(22) PCT Filed: Jun. 21, 2023

(86) PCT No.: PCT/JP2023/022889
§ 371 (c)(1),
(2) Date: Feb. 29, 2024

(51) Int. Cl.
*H02K 24/00* (2006.01)
*H02K 11/21* (2016.01)
*H02K 11/30* (2016.01)

(52) U.S. Cl.
CPC ............ *H02K 24/00* (2013.01); *H02K 11/21* (2016.01); *H02K 11/30* (2016.01)

(58) Field of Classification Search
CPC ........ H02K 11/21; H02K 11/30; H02K 11/33; H02K 24/00
USPC .................................................. 310/68 B, 71
See application file for complete search history.

(56) References Cited

U.S. PATENT DOCUMENTS

| | | | | |
|---|---|---|---|---|
| 2,951,193 | A * | 8/1960 | Rave, Jr. .............. | B23Q 35/123 333/19 |
| 2004/0145264 | A1 * | 7/2004 | Miya ................... | G01D 5/2086 310/161 |
| 2004/0150395 | A1 * | 8/2004 | Miya ...................... | G01D 5/204 310/68 B |
| 2007/0278876 | A1 * | 12/2007 | Haga ..................... | H02K 3/325 310/260 |

(Continued)

FOREIGN PATENT DOCUMENTS

| | | |
|---|---|---|
| CN | 101740217 A | 6/2010 |
| CN | 103036386 A | 4/2013 |

(Continued)

OTHER PUBLICATIONS

International Search Report in PCT Application No. PCT/JP2023/022889 mailed Sep. 12, 2023, 5pp.

(Continued)

*Primary Examiner* — Rashad H Johnson
(74) *Attorney, Agent, or Firm* — HAUPTMAN HAM, LLP

(57) ABSTRACT

A resolver includes a first transformer coil provided on a first board of a stator, and a second transformer coil provided on a second board of a rotor. The first board is provided with electric elements placed around a rotary shaft and inward of the first transformer coil, and signal wires of the electric elements. The first transformer coil includes an arc-shaped first outer portion and a first inner portion that are provided with a first air gap therebetween. The second transformer (Continued)

coil includes a ring-shaped second outer portion and a second inner portion that are provided with a second air gap therebetween. The first air gap and the second air gap are provided, facing each other in a rotary shaft direction. The signal wires are routed in an opening region in which the first outer portion and the first inner portion are not present, in a ring-shaped region in which the first transformer coil is extended.

6 Claims, 5 Drawing Sheets

(56) References Cited

U.S. PATENT DOCUMENTS

| | | | | |
|---|---|---|---|---|
| 2009/0033320 A1* | 2/2009 | Kikuchi | ............... | G01D 5/2046 324/207.25 |
| 2009/0289622 A1* | 11/2009 | Kikuchi | ................. | H02K 24/00 324/207.25 |
| 2010/0117631 A1 | 5/2010 | Inoue et al. | | |
| 2010/0156401 A1* | 6/2010 | Nishiguchi | ............ | G01D 5/208 324/207.25 |
| 2010/0321007 A1* | 12/2010 | Fukuda | ................ | G01D 5/2093 324/207.25 |
| 2011/0043196 A1* | 2/2011 | Fujita | ................... | G01D 5/2046 324/207.16 |
| 2011/0057648 A1* | 3/2011 | Goto | ....................... | G01D 5/145 324/207.25 |
| 2012/0007592 A1* | 1/2012 | Manabe | ............... | G01D 5/2073 324/207.25 |
| 2012/0200202 A1* | 8/2012 | Asai | ....................... | H02K 24/00 310/68 B |
| 2013/0015748 A1* | 1/2013 | Takei | .................... | F16C 35/077 310/68 B |
| 2013/0271122 A1* | 10/2013 | Kino | ........................ | G01B 7/30 324/207.25 |
| 2013/0342192 A1* | 12/2013 | Kanemitsu | ........... | G01D 5/2093 324/207.17 |
| 2021/0257950 A1* | 8/2021 | Taniguchi | ............. | H02P 27/085 |
| 2021/0384789 A1* | 12/2021 | Mawatari | ................. | H02K 3/28 |
| 2022/0094236 A1* | 3/2022 | Takahashi | .............. | H02K 11/33 |
| 2023/0188007 A1* | 6/2023 | Sano | ..................... | H02K 11/33 310/68 D |
| 2023/0188008 A1* | 6/2023 | Sano | ..................... | H02K 11/33 310/66 |

FOREIGN PATENT DOCUMENTS

| | | |
|---|---|---|
| CN | 103512489 A | 1/2014 |
| DE | 102009052764 A1 | 7/2010 |
| JP | H08136211 A | 5/1996 |
| JP | 2010117169 A | 5/2010 |
| JP | 2011047672 A | 3/2011 |
| JP | 2013083484 A | 5/2013 |
| JP | 2014006175 A | 1/2014 |
| WO | 2022124413 A1 | 6/2022 |
| WO | 2022124415 A1 | 6/2022 |

OTHER PUBLICATIONS

Written Opinion in PCT Application No. PCT/JP2023/022889 mailed Sep. 12, 2023, 7pp.

* cited by examiner

RESOLVER AND SERVO MOTOR

RELATED APPLICATIONS

The present application is a National Phase of International Application Number PCT/JP2023/022889 filed Jun. 21, 2023.

TECHNICAL FIELD

The present invention relates to a resolver that detects the angle of rotation of a rotor relative to a stator, and a servo motor including the resolver.

BACKGROUND ART

A resolver that detects the angle of rotation of a rotor relative to a stator is conventionally known in which a coil (also referred to as a "sheet coil") is placed on a sheet-like board provided to each of the stator and the rotor. The use of the sheet coil promotes a reduction in the thickness of the coil. For example, Patent Literature 1 discloses a resolver having an annular sheet coil on a stator board.

CITATION LIST

Patent Literature

Patent Literature 1: WO 2022/124415 A

DISCLOSURE OF THE INVENTION

Problems to be Solved by the Invention

It is considered to make use of a region that is around a rotary shaft and inward of the annular sheet coil on the stator board, as a region in which an electric element of some kind is placed, in a resolver such as in Patent Literature 1. However, a problem in this case is how a signal wire that connects the electric element and an external control device should be routed. In other words, in this case, the electric element is surrounded by the annular sheet coil. Hence, simply routing the signal wire of the electric element to the outer side across the annular sheet coil is not possible, and it is necessary to provide the board with a special configuration for routing the signal wire. Consequently, the structure of the stator board can be complicated.

A resolver and servo motor of the present invention have been devised in view of such a problem, and one of objects thereof is to make use of a region that is around a rotary shaft and inward of a coil on a stator board and to achieve simple routing of a signal wire. Note that the present invention is not limited to this object, but also has another object of exerting operations and effects that can be derived by configurations presented in DESCRIPTION OF PREFERRED EMBODIMENT described below, the operations and effects being unobtainable by the known technology.

Solutions to the Problems

A resolver and servo motor of the disclosure can be achieved as aspects (application examples) disclosed below, and solve at least a part of the above problem. Any of Aspect 2 and subsequent aspects is an aspect that can be additionally selected as appropriate, and is an aspect that can be omitted. Any of Aspect 2 and the subsequent aspects does not disclose an aspect and configuration that are essential to the present invention.

Aspect 1. A resolver of the disclosure is a resolver that detects the angle of rotation of a rotor relative to a stator, in which the stator includes: a first exciting coil provided on a sheet-like first board; and a first transformer coil provided on the first board, and the rotor includes: a first detecting coil provided on a sheet-like second board, facing the first exciting coil in a rotary shaft direction; and a second transformer coil provided on the second board, connected to the first detecting coil and facing the first transformer coil in the rotary shaft direction. The first board is provided with electric elements placed around a rotary shaft and inward of the first transformer coil, and signal wires connecting the electric elements and an external control device. The first transformer coil includes: a first outer portion that is extended in a circumferential direction of the rotary shaft to form an arc shape; and a first inner portion that forms an arc shape extended in the circumferential direction and that is provided continuously with the first outer portion that is around the rotary shaft and inward of the first outer portion, with a first air gap in between. The second transformer coil includes: a second outer portion that forms a ring shape closed in the circumferential direction; and a second inner portion that is connected to the second outer portion to form a ring shape closed in the circumferential direction and that is provided around the rotary shaft and inward of the second outer portion, with a second air gap in between. The first air gap and the second air gap are provided, facing each other in the rotary shaft direction, and the signal wires are routed in an opening region in which the first outer portion and the first inner portion are not present, in a ring-shaped region in which the first transformer coil is extended.

Aspect 2. In the above aspect 1, it is preferable that the first board include a first and a second layer stacked in the rotary shaft direction. In this case, it is preferable that the first outer portion and the first inner portion be provided on each of the first and second layers.

Aspect 3. In the above aspect 1 or 2, it is preferable that the stator include: a second exciting coil that is provided on the first board and has a different multiplication factor of angle from the first exciting coil; and a third transformer coil provided on the first board, and that the rotor include: a second detecting coil provided on the second board, facing the second exciting coil in the rotary shaft direction; and a fourth transformer coil provided on the second board, connected to the second detecting coil and facing the third transformer coil in the rotary shaft direction. In this case, it is preferable that the electric elements be the second exciting coil and the third transformer coil.

Aspect 4. In any of the above aspects 1 to 3, it is preferable that one opening region be formed in the ring-shaped region. In this case, it is preferable that lengths in the circumferential direction of the first outer portion and the first inner portion be greater than a length in the circumferential direction of the opening region.

Aspect 5. In aspects including the above aspect 2, it is preferable that among the signal wires, a positive connecting wire to be connected to a positive side of the external control device be routed on one of the first layer and the second layer, and that among the signal wires, a negative connecting wire to be connected to a negative side of the external control device be routed on the other of the first layer and the second layer.

Aspect 6. A servo motor of the disclosure includes the resolver in any of the above aspects 1 to 5.

Effects of the Invention

According to the resolver and servo motor of the present disclosure, it is possible to make use of a region that is around the rotary shaft and inward of the first transformer coil on the first board of the stator, as a region in which the electric elements are placed, and furthermore the signal wires of the electric elements are routed in the opening region; therefore, it is possible to achieve simple routing of the signal wires.

DESCRIPTION OF PREFERRED EMBODIMENT

Figure 1:
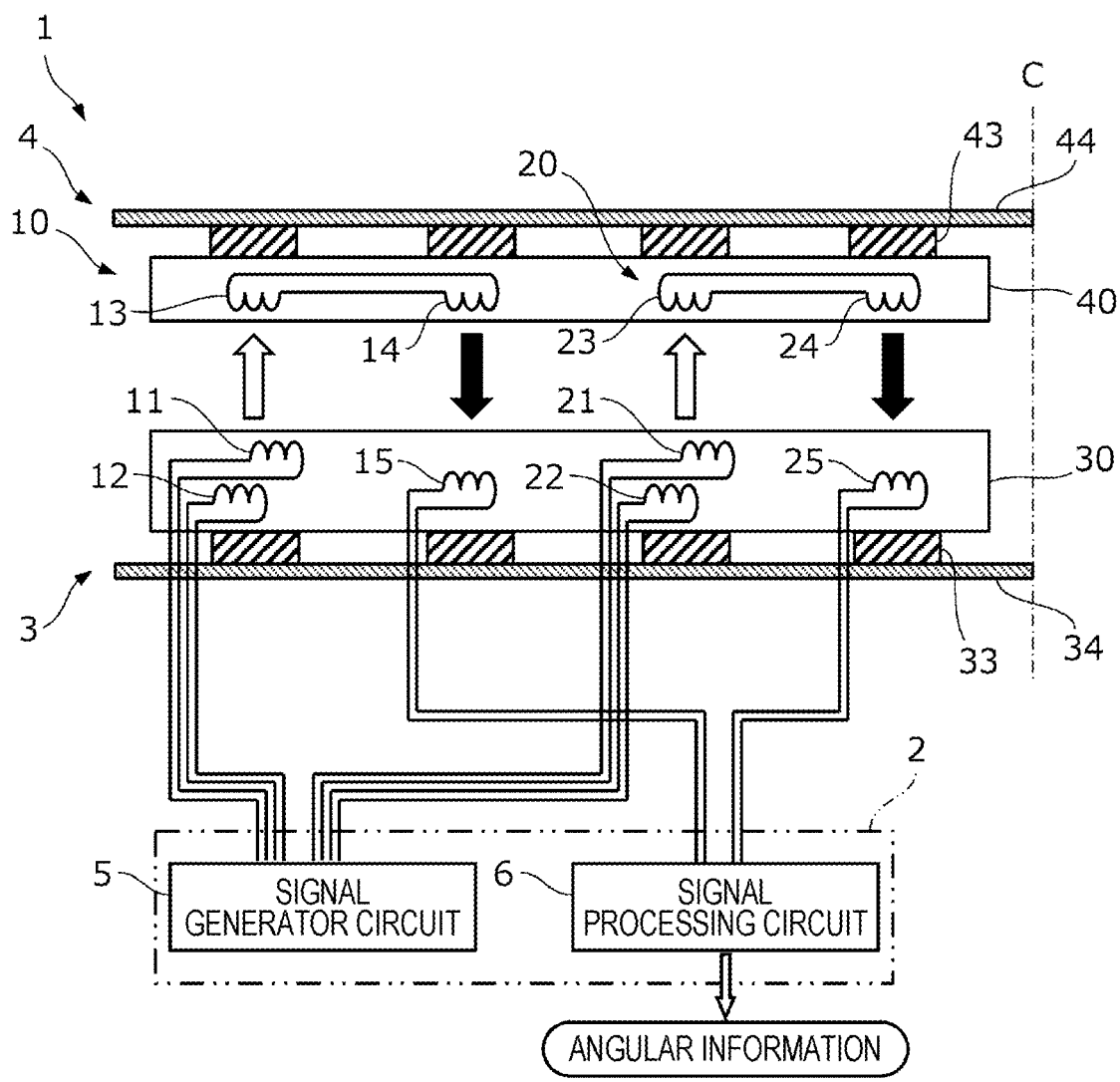
FIG. 1 is a schematic diagram illustrating the structure of a resolver according to an embodiment.

A resolver and a servo motor as an embodiment are described with reference to the drawings. The embodiment presented below is a mere exemplification. There is no intention to preclude various modifications and application of a technology, which are not explicitly stated in the embodiment below. The configurations of the embodiment can be modified and carried out in various manners within the scope that does not depart from the purport of the configurations. Moreover, a selection can be made from the configurations as needed, or the configurations can be combined as appropriate.

The resolver of the embodiment is a detector (sensor) that detects the angle of rotation of a rotor rotating about a rotary shaft C, relative to a stator, and the servo motor of the embodiment is a motor including the resolver. Note that in the drawings, an x mark simply represents the center of rotation of the rotary shaft C. However, the rotor is placed coaxially with the rotary shaft C, and rotates integrally with the rotary shaft C. Each of the stator and the rotor includes a sheet-like board. The resolver is provided with a coil group including a plurality of coils formed on the board. Moreover, the board (first board) of the stator is provided, around the rotary shaft C and inward of the coil group, with electric elements that are electrically connected to an external control device.

In order to simplify routing of signal wires that connect the above electric elements and external control device, the resolver of the embodiment is configured such that a first transformer coil provided on the first board among the above plurality of coils has an arc shape extended in a circumferential direction of the rotary shaft C. Consequently, it is possible to route the signal wires of the electric elements in an opening region in which the first transformer coil is not present, in a ring-shaped region in which the first transformer coil is extended. In other words, the resolver of the embodiment is designed to be capable of making use of a region that is around the rotary shaft C and inward of the first transformer coil, as a region in which the electric elements are placed, without providing the first board with a special configuration for routing the signal wires of the electric elements.

In the following description, a direction in which the rotary shaft C extends (a rotary shaft direction) is defined as the axial direction/axially, and a direction orthogonal to the axial direction, the direction including a direction away from the rotary shaft C and a direction closer to the rotary shaft C, is defined as the radial direction/radially. Moreover, in the radial direction, a direction toward the rotary shaft C is defined as "radially inward (the radially inner side)," and the opposite direction (a direction away from the rotary shaft C) is defined as "radially outward (the radially outer side)." A direction orthogonal to the axial direction, which is a direction around the rotary shaft C, is defined as the circumferential direction.

[1. Configurations]
[A. Entire Configuration]

FIG. 1 is a schematic diagram illustrating the configuration of a resolver 1 of the embodiment. The resolver 1 is a detector (sensor) that detects the angle of rotation of a rotor 4 relative to a stator 3, and is applied to, for example, an unillustrated servo motor. As illustrated in FIG. 1, the resolver 1 of the embodiment includes a first coil group 10 having first exciting coils 11 and 12, a first detecting coil 13, a first transmission coil 14 (a second transformer coil), and a first receiving coil 15 (the first transformer coil). The first exciting coils 11 and 12 and the first detecting coil 13 are multipole coils having a multiplication factor of angle of nX, and form n magnetic pole pairs. Note that the value of n representing the multiplication factor of angle is simply required to be a natural number equal to or greater than two, and as the value of n increases, the angular resolution increases.

Of the coils 11 to 15 forming the first coil group 10, the first exciting coils 11 and 12 and the second receiving coil 15 are provided to the stator 3, and electrically connected to a control device 2. Moreover, the first detecting coil 13 and the first transmission coil 14 are provided to the rotor 4, and placed, facing the first exciting coils 11 and 12 and the first receiving coil 15, respectively, in the axial direction. The control device 2 is an electronic control device (computer) provided at a different position from the stator 3 and the rotor 4. The control device 2 incorporates a signal generator circuit 5 that generates alternating current signals to be supplied to the first exciting coils 11 and 12 and second exciting coils 21 and 22 described below, and a signal processing circuit 6 that outputs angular information corresponding to the angle of rotation on the basis of the alternating current signals returned from the first receiving coil 15 and a second receiving coil 25 described below.

Moreover, the first coil group 10 of the embodiment is provided with two coils, the first sine exciting coil 11 and the first cosine exciting coil 12, as the first exciting coils 11 and 12. The control device 2 inputs alternating current signals that are 90 electrical degrees apart in phase into the first sine exciting coil 11 and the first cosine exciting coil 12, respectively. More specifically, a cosine-wave alternating current signal is inputted into the first sine exciting coil 11, and a sine-wave alternating current signal is inputted into the first cosine exciting coil 12. In other words, the resolver 1 of the embodiment is a two-phase excitation/single-phase output detector, and is a modulated wave resolver into which amplitude modulated alternating current signals are inputted and that detects the angle of rotation from a phase modulated signal that is generated in the detecting coil by use of the alternating current signals.

The resolver 1 of the embodiment further includes a second coil group 20 placed radially inward of the first coil group 10. The second coil group 20 includes the second exciting coils 21 and 22, a second detecting coil 23, a second transmission coil 24 (a fourth transformer coil), and the second receiving coil 25 (a third transformer coil). The second exciting coils 21 and 22 and the second detecting coil 23 are coils having a multiplication factor of angle of 1X, and form one magnetic pole pair.

Of the coils 21 to 25 forming the second coil group 20, the second exciting coils 21 and 22 and the second receiving coil 25 are provided to the stator 3, and electrically connected to the control device 2. Moreover, the second detecting coil 23 and the second transmission coil 24 are provided to the rotor 4, and placed, facing the second exciting coil 21 and 22 and the second receiving coil 25, respectively, in the axial direction. In other words, in the embodiment, the above "electric elements" are the second exciting coils 21 and 22 and the second receiving coil 25, which are provided to the stator 3, among a plurality of the coils 21 to 25 forming the second coil group 20. Moreover, the above "external control device" is the control device 2.

The second coil group 20 of the embodiment is provided with two coils, the second sine exciting coil 21 and the second cosine exciting coil 22, as the second exciting coils 21 and 22, as in the first coil group 10. The control device 2 inputs alternating current signals that are 90 electrical degrees apart in phase into the second sine exciting coil 21 and the second cosine exciting coil 22, respectively. More specifically, a cosine-wave alternating current signal is inputted into the second sine exciting coil 21, and a sine-wave alternating current signal is inputted into the second cosine exciting coil 22.

In the first coil group 10, when the control device 2 inputs the alternating current signals into the first exciting coils 11 and 12 having the multiplication factor of angle of nX, the first exciting coils 11 and 12 are excited to generate magnetic flux as indicated by a hollow arrow in FIG. 1. The magnetic flux links with the first detecting coil 13 of the rotor 4 to generate an induced voltage. The first detecting coil 13 and the first transmission coil 14 are connected in series, and a current of the induced voltage excites the first transmission coil 14 to generate magnetic flux (refer to a black-filled arrow of FIG. 1). The magnetic flux links with the first receiving coil 15 of the stator 3 to generate an induced voltage. The output waveform of the induced voltage is outputted to the control device 2 to obtain the angle of rotation of the rotor 4 on the basis of a change in the phase of the output waveform.

The same applies to the second coil group 20. When the control device 2 inputs the alternating current signals into the second exciting coils 21 and 22 having the multiplication factor of angle of 1X, the second exciting coils 21 and 22 are excited to generate magnetic flux as indicated by a hollow arrow in FIG. 1. The magnetic flux links with the second detecting coil 23 to generate an induced voltage. The second detecting coil 23 and the second transmission coil 24 are connected in series, and a current of the induced voltage excites the second transmission coil 24 to generate magnetic flux (refer to a black-filled arrow of FIG. 1). The magnetic flux links with the second receiving coil 25 of the stator 3 to generate an induced voltage. The output waveform of the induced voltage is outputted to the control device 2 to obtain the angle of rotation of the rotor 4 on the basis of a change in the phase of the output waveform.

In other words, the resolver 1 of the embodiment is a multi-speed resolver including two coil groups 10 and 20 having the exciting coils 11, 12, 21, and 22 and the detecting coils 13 and 23, which have different multiplication factors of angle from each other. In this manner, the angle of rotation is detected by use of a plurality of multiplication factors of angle, so that the detection performance of the angle of rotation of the resolver 1 can increase.

Figure 2:
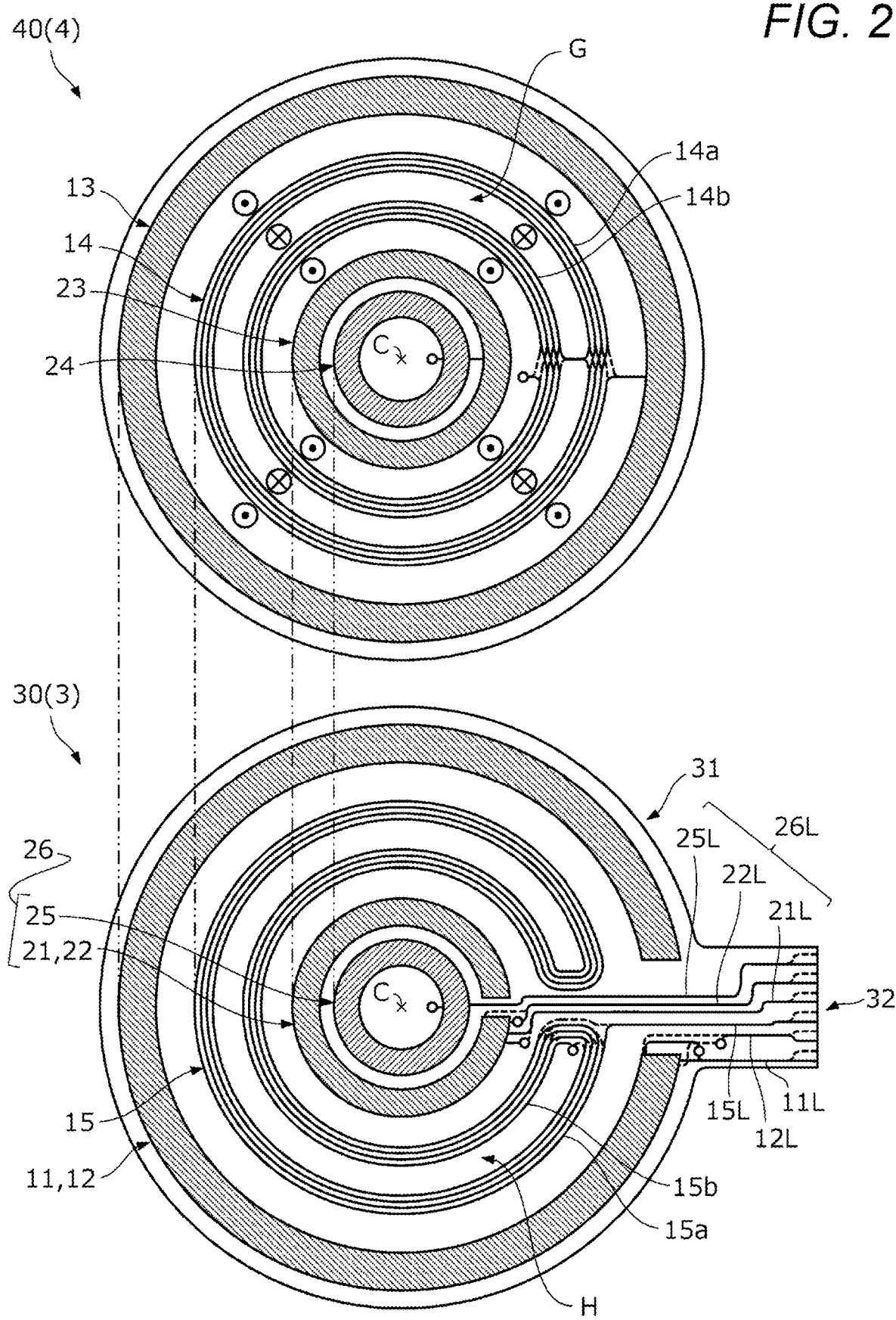
FIG. 2 is a plan view illustrating a first board of a stator and a second board of a rotor, which are included in the resolver of FIG. 1, in a column.

FIG. 2 is a plan view of boards 30 and 40 described below, which are included in the stator 3 and the rotor 4 of the resolver 1 of the embodiment, respectively, as viewed from one side in the axial direction (a side on which the rotor 4 is provided relative to the stator 3). The stator 3 and the rotor 4 are stacked with a slight gap (air gap) therebetween in the axial direction in attitudes illustrated in FIG. 2 (in other words, the rotor 4 on the upper side in FIG. 2 is stacked on the stator 3 on the lower side in FIG. 2 in orientations as illustrated in FIG. 2 without being flipped over). The axial length (thickness) of the air gap is assumed to be a first dimension A.

The first exciting coils 11 and 12, the first receiving coil 15, the second exciting coils 21 and 22, and the second receiving coil 25, which are provided to the stator 3, are placed in this order from the radially outer side. The first exciting coils 11 and 12, the first receiving coil 15, the second exciting coils 21 and 22, and the second receiving coil 25 are also collectively referred to below as the "stator coils," and the reference signs are omitted. The stator coils are placed, each displaced in the radial direction, without overlapping each other, and extend in the circumferential direction. In other words, it can be also said that the stator 3 is provided with ring-shaped regions for providing the stator coils, which are arranged next to one another in the radial direction.

Moreover, the stator 3 is provided with signal wires 11L, 12L, 15L, 21L, 22L, and 25L. The signal wires 11L, 12L, 15L, 21L, 22L, and 25L are signal wires that electrically connect the stator coils (the first exciting coils 11 and 12, the first receiving coil 15, the second exciting coils 21 and 22, and the second receiving coil 25) to the control device 2. Among them, the signal wires 11L, 12L, 21L, and 22L are signal input wires that are connected to the exciting coils 11, 12, 21, and 22, and the signal wires 15L and 25L are signal output wires that are connected to the receiving coils 15 and 25 and transfer output signals to the control device 2. Among the signal input wires, the signal wires 11L and 21L are cosine wave input signal wires that are connected to cosine wave outputs of the control device 2, and the signal wires 12L and 22L are sine wave input signal wires that are connected to sine wave outputs of the control device 2. The signal wires 11L, 12L, 15L, 21L, 22L, and 25L are also collectively referred to below as the "stator signal wires," and the reference signs are omitted.

Figure 3:
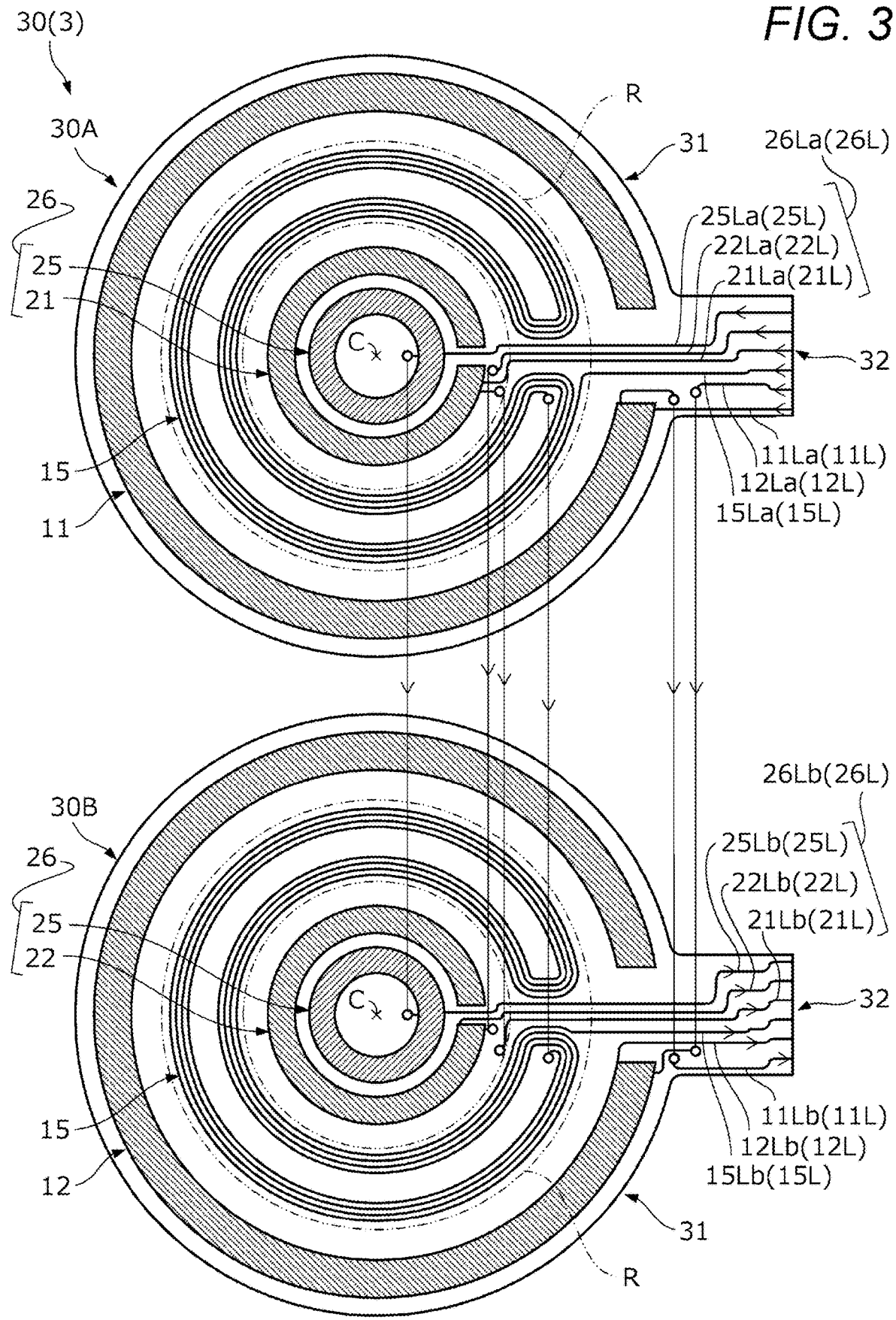
FIG. 3 is a plan view illustrating a first and a second layer of the stator of FIG. 2 in a column.

The stator signal wires (the signal wires 11L, 12L, 15L, 21L, 22L, and 25L) include positive connecting wires 11La, 12La, 15La, 21La, 22La, and 25La that are connected to the positive side (positive terminals) of the control device 2, and negative connecting wires 11Lb, 12Lb, 15Lb, 21Lb, 22Lb, and 25Lb that are connected to the negative side (negative terminals) of the control device 2 (refer to FIG. 3). When the positive connecting wires 11La, 12La, 15La, 21La, 22La, and 25La are collectively described below (without particularly distinguishing among them), they are also simply referred to as the "positive connecting wires," and the reference signs are omitted. Similarly, when the negative connecting wires 11Lb, 12Lb, 15Lb, 21Lb, 22Lb, and 25Lb are collectively described (without particularly distinguishing among them), they are also simply referred to as the "negative connecting wires," and the reference signs are omitted.

As illustrated in FIG. 2, the first detecting coil 13, the first transmission coil 14, the second detecting coil 23, and the second transmission coil 24, which are provided to the rotor 4, are placed in this order from the radially outer side, as in the stator coils. The first detecting coil 13, the first transmission coil 14, the second detecting coil 23, and the second transmission coil 24 are also collectively referred to below as the "rotor coils," and the reference signs are omitted. The rotor coils are placed, each displaced in the radial direction, without overlapping each other, and extend in the circumferential direction. In other words, it can also be said that the rotor 4 is provided with ring-shaped regions for providing the rotor coils, which are arranged next to one another in the radial direction.

[B. Stator]

As described above, the stator 3 is a component provided with the stator coils, and is fixed to an unillustrated casing of an apparatus to which the resolver 1 is applied (such as a servo motor or an apparatus on which a servo motor is mounted). As illustrated in FIG. 1, the stator 3 is provided with the sheet-like first board 30, a plurality of cores 33 stacked on the other side in the axial direction (a side away from the rotor 4) of the first board 30, and a sheet member 34 stacked on the other side in the axial direction of the cores 33.

The first board 30 is a thin sheet formed of non-conductive resin (such as polyimide). The stator coils are formed on the first board 30. In the embodiment, as illustrated in FIG. 2, the first board 30 includes a disk-shaped board portion 31 expanding about the rotary shaft C, and a rectangular connector portion 32 protruding radially outward from a part of the perimeter of the board portion 31. The stator coils are formed on the board portion 31. In other words, the stator coils are sheet coils formed (printed) on the sheet-like first board 30. The sheet coils are used in this manner to enable promoting reductions in the thicknesses of the stator coils, and by extension a reduction in the thickness of the resolver 1.

Moreover, the stator signal wires are drawn out from the board portion 31 to the connector portion 32. The connector portion 32 is connected to an unillustrated connector of the control device 2. In this manner, the stator coils are connected to the control device 2 via the stator signal wires and the connector. Note that, for example, copper foil is used for the stator coils and the stator signal wires.

The plurality of cores 33 is ring-shaped members provided at positions corresponding respectively to the stator coils, and spaced apart from each other in the radial direction. For example, magnetic steel sheets, or magnetic sheets including amorphous or ferrite powder are used for the cores 33.

The sheet member 34 is a component that covers the board portion 31, which is described below, of the first board 30 from the other side in the axial direction, and forms substantially the same outline as the board portion 31. For example, a sheet of an aluminum material is used for the sheet member 34.

FIG. 3 is a plan view illustrating the first board 30 of FIG. 2, dividing the first board 30 into two layers. As is clear from FIG. 3, the first board 30 of the stator 3 of the embodiment includes two layers, a first layer 30A and a second layer 30B. The first layer 30A and the second layer 30B are stacked in the axial direction in attitudes illustrated in FIG. 3 (in other words, the first layer 30A on the upper side in FIG. 3 is stacked on the second layer 30B on the lower side in FIG. 3 in orientations as illustrated in FIG. 3 without being flipped over). The layers 30A and 30B are each provided with through-holes to electrically connect the coils on the layers 30A and 30B via the through-holes. Note that in FIG. 3, arrows drawn on the stator signal wires and arrows drawn on thin solid lines linking the through-holes provided in the layers 30A and 30B indicate the direction of flow of current. However, input/output signals of the stator coils are alternating current signals, so that the direction of flow of current is at a certain point in time, and current flows also in an opposite direction.

In the embodiment, among the stator coils, the first sine exciting coil 11, the first receiving coil 15, the second sine exciting coil 21, and the second receiving coil 25 are provided on the first layer 30A, and placed in this order from the radially outer side. Moreover, the first cosine exciting coil 12, the first receiving coil 15, the second cosine exciting coil 22, and the second receiving coil 25 are provided on the second layer 30B, and placed in this order from the radially outer side. In other words, in the embodiment, the first receiving coil 15 and the second receiving coil 25 are provided on both of the first layer 30A and the second layer 30B.

Moreover, among the stator coils excluding the second receiving coil 25, the coils 11, 12, 15, 21, and 22 are formed in C-shaped regions each having a missing part in the circumferential direction, on the layers 30A and 30B provided with the coils 11, 12, 15, 21, and 22. Put another way, the coils 11, 12, 15, 21, and 22 are formed in regions (the C-shaped regions) excluding parts in the circumferential direction from the ring-shaped regions provided respectively with the coils 11, 12, 15, 21, and 22. The coils 11, 12, 15, 21, and 22 formed in the C-shaped regions are also collectively referred to below as the "C-shaped coils," and the reference signs are omitted.

The parts of the regions are used as regions for routing the signal wires 15L, 21L, 22L, and 25L of the coils 15, 21, 22, and 25 placed radially inward of the C-shaped coils. The parts of the regions are preferably set at the same position (in the same phase) as the position provided with the connector portion 32, or at a position (in a phase) overlapping a fan-shaped portion linking the rotary shaft C and the connector portion 32, in order to further simplify the routing of the signal wires 15L, 21L, 22L, and 25L. Moreover, the circumferential lengths of the parts of the regions are preferably set to be a short length that allows the signal wires 15L, 21L, 22L and 25L to be routed in order to secure wide coil areas for the C-shaped coils.

Note that in FIGS. 2 and 3, the illustrations of the coil patterns of the first exciting coils 11 and 12 and the second exciting coils 21 and 22 are omitted. However, known coil patterns may be applied to the coils 11, 12, 21, and 22. For example, the coil pattern of a comb-type closed coil (refer to Patent Literature 1) may be applied to the first exciting coils 11 and 12. Moreover, a coil pattern in which a conductor is routed in a spiral fashion (refer to Patent Literature 1) may be applied to the second exciting coils 21 and 22. The coil pattern of the first receiving coil 15 is described below.

In contrast to the C-shaped coils, the second receiving coil 25 is formed in annular regions on the first layer 30A and the second layer 30B. Note that in FIGS. 2 and 3, the illustration of the coil pattern of the second receiving coil 25 is omitted. However, a known coil pattern may be applied to the second receiving coil 25. For example, a form in which a conductor is routed in such a manner as to turn around the rotary shaft C in a spiral may be applied.

In the embodiment, as illustrated in FIG. 3, the positive connecting wires 11La, 12La, 15La, 21La, 22La, and 25La of the stator signal wires are provided on the first layer 30A. Moreover, the negative connecting wires 11Lb, 12Lb, 15Lb, 21Lb, 22Lb, and 25Lb of the stator signal wires are provided on the second layer 30B. As illustrated in FIGS. 2 and 3, the positive connecting wires 11La, 12La, 15La, 21La, 22La, and 25La and their corresponding negative connecting wires 11Lb, 12Lb, 15Lb, 21Lb, 21Lb, 22Lb, and 25Lb are provided in such a manner that at least portions thereof overlap each other in the axial direction, apart from two end portions (an end portion of each of the stator coil side and an end portion in the connector portion 32).

More specifically, in terms of the sine exciting coil 11 and the first cosine exciting coil 12, the positive connecting wires 11La and 12La of the signal wires 11L and 12L are provided on the first layer 30A, and the negative connecting wires 11Lb and 12Lb of the signal wires 11L and 12L are provided on the second layer 30B in such a manner as to overlap the positive connecting wires 11La and 12La in the axial direction. Moreover, in terms of the first receiving coil 15, the positive connecting wire 15La of the signal wire 15L is provided on the first layer 30A, and the negative connecting wire 15Lb of the signal wire 15L is provided on the second layer 30B in such a manner as to overlap the positive connecting wire 15La in the axial direction.

Similarly, in terms of the second sine exciting coil 21 and the second cosine exciting coil 22, the positive connecting wires 21La and 22La of the signal wires 21L and 22L are provided on the first layer 30A, and the negative connecting wires 21Lb and 22Lb of the signal wires 21L and 22L are provided on the second layer 30B in such a manner as to overlap the positive connecting wires 21La and 22La in the axial direction. Moreover, in terms of the second receiving coil 25, the positive connecting wire 25La of the signal wire 25L is provided on the first layer 30A, and the negative connecting wire 25Lb of the signal wire 25L is provided on the second layer 30B in such a manner as to overlap the positive connecting wire 25La in the axial direction. Note that each of the positive connecting wires and its corresponding negative connecting wire may be routed in such a manner that their end portions do not overlap each other in the axial direction in a radially outer portion of the connector portion 32. Consequently, it is possible to prevent passage of electric current between the each of the positive connecting wires and its corresponding negative connecting wire at the time of connection with the connector of the control device 2.

Here, a case is described in which the positive connecting wire and the negative connecting wire of each of the stator coils are routed parallel on the same layer (the first layer 30A or the second layer 30B). In this case, it is necessary to provide a relatively wide gap (conductor spacing) between the two connecting wires due to restrictions on manufacture (etching). However, if the gap is wide, the magnetic flux cancellation effect of the two connecting wires is weakened. Consequently, particularly in the exciting coils 11, 12, 21, and 22 through which a relatively large current flows, leakage flux tends to be generated between two connecting wires of each of the exciting coils 11, 12, 21, and 22. Moreover, in the receiving coils 15 and 25, the leakage flux tends to link in the gap between two connecting wires of each of the receiving coils 15 and 25, which may produce an adverse effect. In addition, the leakage flux is generated in the same direction (that is, the axial direction) as the magnetic fields of the exciting coils 11, 12, 21, and 22. Therefore, the leakage flux may interfere with other coils to produce an adverse effect.

On the other hand, in the embodiment, as described above, two connecting wires of each of the stator coils are provided on different layers from each other. Consequently, the conductor spacing between the two connecting wires can be made equal to the thickness of the first board 30, so that the gap between the two connecting wires can be made relatively narrow. Hence, it is possible to prevent generation of leakage flux in each of the exciting coils 11, 12, 21, and 22. Moreover, it is possible to prevent linkage of leakage flux in the gap between two connecting wires in each of the receiving coils 15 and 25. Furthermore, the two connecting wires are arranged next to each other in the axial direction. Therefore, the direction of the leakage flux is orthogonal to the direction of the magnetic fields of the exciting coils 11, 12, 21, and 22. Hence, it is possible to prevent the leakage flux of the exciting coils 11, 12, 21, and 22 from influencing other coils.

[C. Rotor]

As described above, the rotor 4 is a component provided with the rotor coils, and is supported on the rotary shaft C in such a manner as to be rotatable integrally with the rotary shaft C (about the center of rotation) relative to the stator 3. As illustrated in FIG. 1, the rotor 4 is provided with the sheet-like second board 40, a plurality of cores 43 stacked on one side in the axial direction (a side away from the stator 3) of the second board 40, and a sheet member 44 stacked on the one side in the axial direction of the cores 43, as in the stator 3.

The second board 40 is a thin sheet formed of non-conductive resin (such as polyimide). As illustrated in FIG. 2, the second board 40 forms, for example, a disk-shaped outline expanding about the rotary shaft C. The outer diameter of the second board 40 is set to be equal to, for example, the outer diameter of the board portion 31 of the first board 30. The rotor coils are formed on the second board 40. In other words, the rotor coils are sheet coils formed (printed) on the sheet-like second board 40. For example, copper foil is used for the rotor coils.

The plurality of cores 43 is ring-shaped members provided at positions corresponding respectively to the rotor coils, and spaced apart from each other in the radial direction. For example, magnetic steel sheets, or magnetic sheets including amorphous or ferrite powder are used for the cores 43. The sheet member 44 is a component that covers the second board 40 from the one side in the axial direction, and forms substantially the same outline as the second board 40. For example, an aluminum sheet is used for the sheet member 44.

Figure 4:
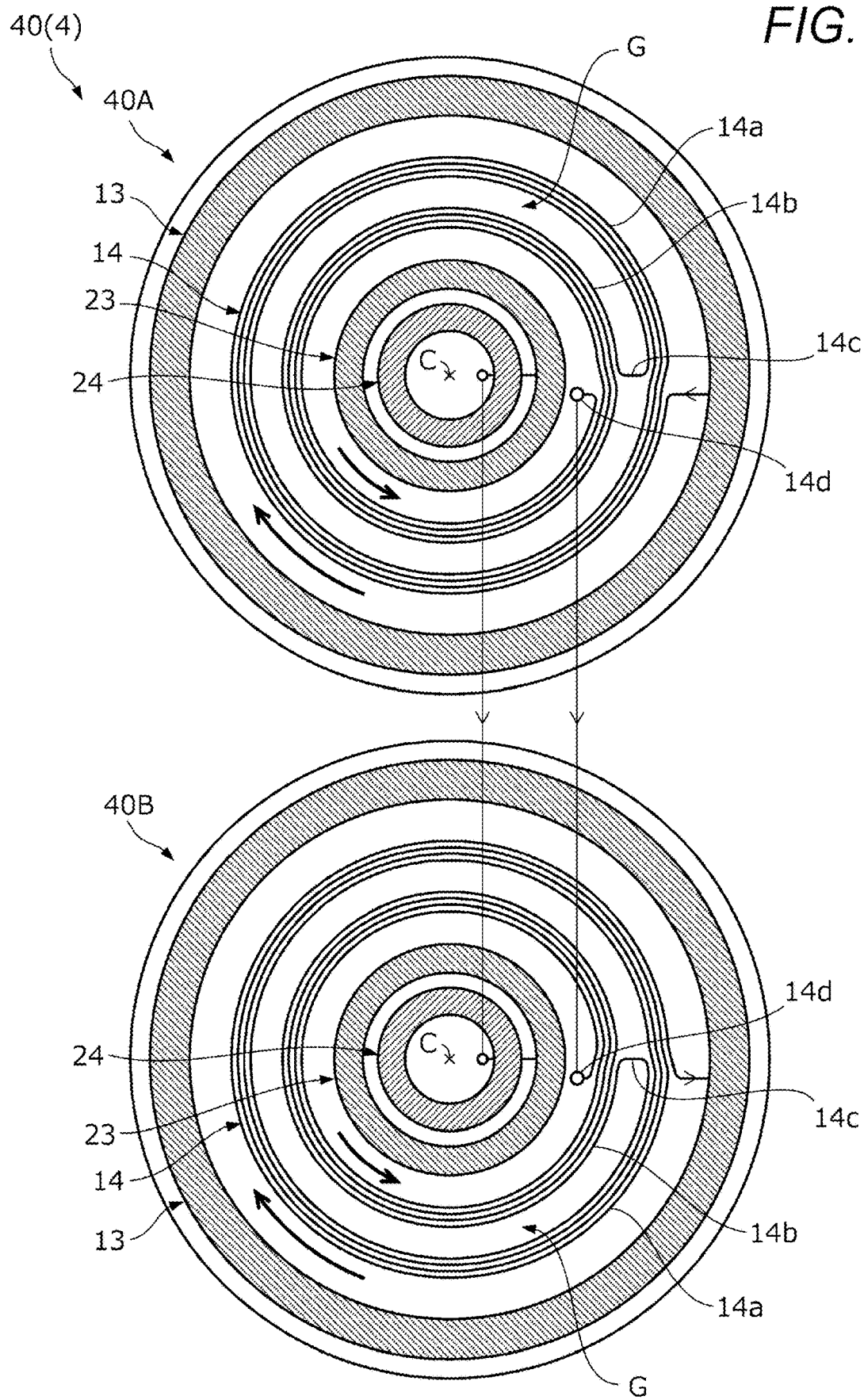
FIG. 4 is a plan view illustrating a first and a second layer of the rotor of FIG. 2 in a column.

FIG. 4 is a plan view illustrating the second board 40 of FIG. 2, dividing the second board 40 into two layers. As is clear from FIG. 4, the second board 40 of the rotor 4 of the embodiment includes two layers, a first layer 40A and a second layer 40B. The first layer 40A and the second layer 40B are stacked in the axial direction in attitudes illustrated in FIG. 4 (in other words, the first layer 40A on the upper side in FIG. 4 is stacked on the second layer 40B on the lower side in FIG. 4 in orientations illustrated in FIG. 4 without being flipped over). The layers 40A and 40B are each provided with through-holes to electrically connect the coils on the layers 40A and 40B via the through-holes.

The first detecting coil 13, the first transmission coil 14, the second detecting coil 23, and the second transmission coil 24 are placed in this order from the radially outer side on each of the first layer 40A and the second layer 40B. In other words, in the embodiment, the rotor coils are provided on both of the first layer 40A and the second layer 40B. Moreover, the rotor coils are formed in annular regions on each of the first layer 40A and the second layer 40B.

Note that in FIGS. 2 and 4, the illustrations of the coil patterns of the first detecting coil 13, and the second detecting coil 23, and the second transmission coil 24 are omitted. However, known coil patterns may be applied to the coils 13, 23, and 24. For example, the coil pattern of the comb-type closed coil (refer to Patent Literature 1) may be applied to the first detecting coil 13. For example, a coil pattern in which a conductor is routed in a spiral fashion (refer to Patent Literature 1) may be applied to the second detecting coil 23. A form in which a conductor is routed in such a manner as to turn around the rotary shaft C in a spiral may be applied to the second transmission coil 24.

The coil pattern (form) of the first transmission coil 14 is described in detail below. As illustrated in FIG. 4, the first transmission coil 14 includes two portions, an outer portion 14a (a second outer portion) and an inner portion 14b (a second inner portion), which form ring shapes that are closed in the circumferential direction.

The outer portion 14a is a portion formed of a conductor wound at least once around the rotary shaft C. In the outer portion 14a, the conductor is routed in one direction in the circumferential direction. The outer portion 14a formed by the conductor making four turns in a clockwise direction and in a spiral fashion is exemplified here. Note that in FIG. 4, thick arrows indicate a direction in which the conductor is routed, which translates to the direction of flow of current. Moreover, in FIG. 4, arrows drawn on the conductors and arrows drawn on thin solid lines linking the through-holes provided in the layers 40A and 40B indicate the direction of flow of current. Note that the current in the first transmission coil 14 is alternating current. Therefore, the direction of flow of current is at a certain point in time, and current flows also in an opposite direction.

The inner portion 14b is a portion formed of the conductor wound at least once around the rotary shaft C with an air gap G (a second air gap) in between with the outer portion 14a radially inward of the outer portion 14a. In the inner portion 14b, the conductor is routed in the other direction in the circumferential direction (a direction opposite to the conductor forming the outer portion 14a). The inner portion 14b formed by the conductor making four turns in a counter-clockwise direction and in a spiral fashion is exemplified here. The outer portion 14a and the inner portion 14b are electrically connected to each other.

In other words, the first transmission coil 14 forms an annular shape having two ring-shaped portions (that is, the outer portion 14a and the inner portion 14b) provided with the air gap G therebetween. Moreover, the directions of flow of current in the conductor forming the outer portion 14a and the inner portion 14b of the first transmission coil 14 are different from each other. Consequently, when current flows through the conductor forming the first transmission coil 14, magnetic flux is generated between the outer portion 14a and the inner portion 14b, that is, in the air gap G as illustrated in FIG. 2. The radial dimension of the air gap G is set to be greater than at least the first dimension A and to be at a level that can secure as many the turns of the first transmission coil 14 as possible and generate magnetic flux in the air gap G.

As illustrated in FIG. 4, in the first transmission coil 14 of the embodiment, the outer portion 14a and the inner portion 14b, which are provided on each of the layers 40A and 40B, are electrically connected to each other via one connecting wire 14c. Moreover, the inner portion 14b of the first layer 40A and the inner portion 14b of the second layer 40B are electrically connected to each other via a through-hole 14d. in addition, the outer portion 14a and the inner portion 14b of the first layer 40A, and the inner portion 14b and the outer portion 14a of the second layer 40B are formed in this order by continuously routing the conductor in a single stroke manner.

More specifically, the conductor forming the first transmission coil 14 is wound radially inward in the clockwise direction and in a spiral fashion, on the first layer 40A. Consequently, the outer portion 14a of the first layer 40A is formed. The conductor, which has formed the outer portion 14a of the first layer 40A, is, as the connecting wire 14c, routed in such a manner as to cross the air gap G radially inward and folded back, and wound in the counterclockwise direction and radially inward in a spiral fashion. Consequently, the inner portion 14b of the first layer 40A is formed.

The conductor, which has formed the inner portion 14b of the first layer 40A, is then routed on the second layer 40B via the through-hole 14d, and wound in the counterclockwise direction and radially outward in a spital fashion. Consequently, the inner portion 14b of the second layer 40B is formed. Furthermore, the conductor, which has formed the inner portion 14b of the second layer 40B, is, as the connecting wire 14c, routed in such a manner as to cross the air gap G radially outward and folded back, and wound in the clockwise direction and radially outward in a spiral fashion. Consequently, the outer portion 14a of the second layer 40B is formed.

[D. First Receiving Coil]

Figure 5:
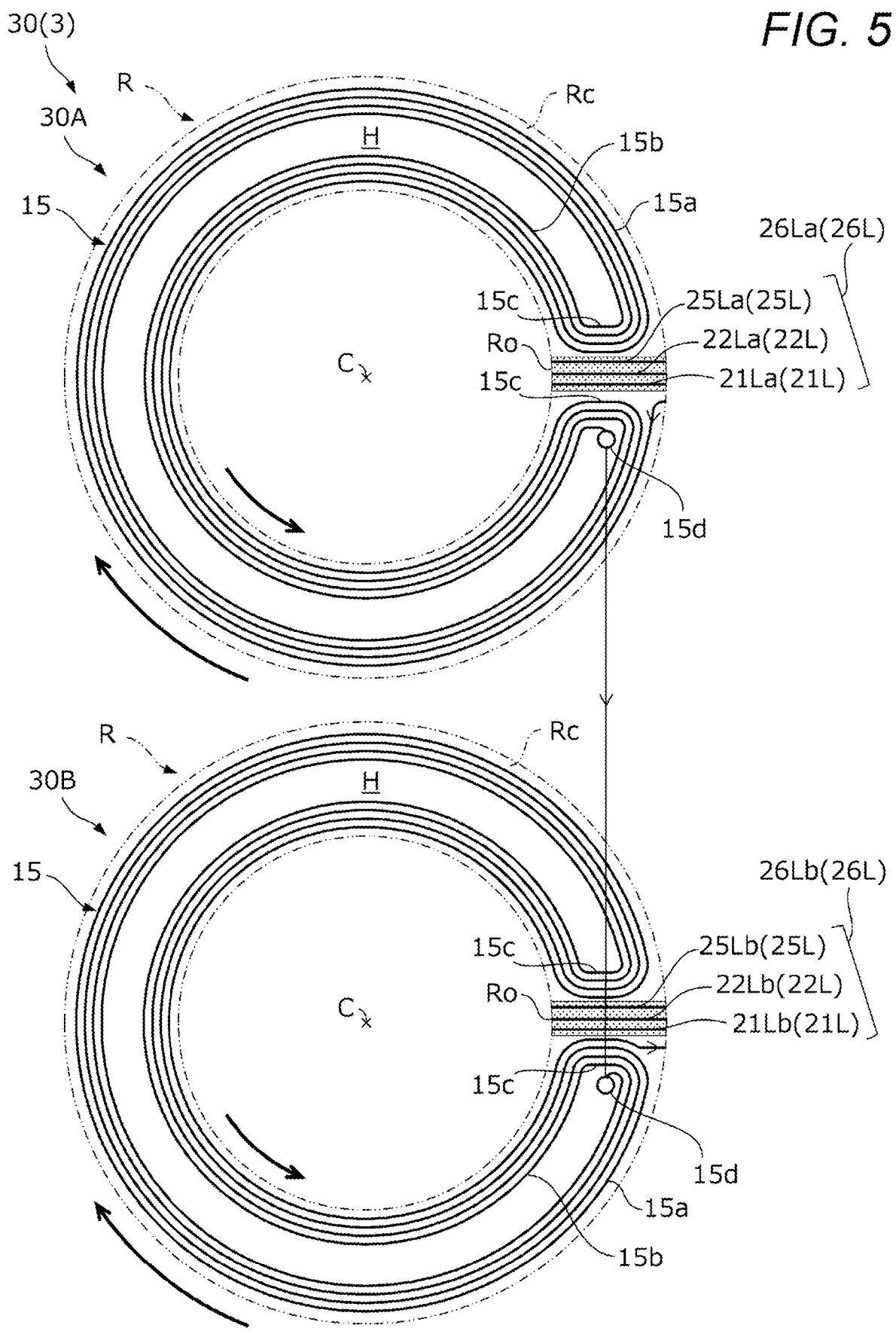
FIG. 5 is an enlarged plan view of an enlarged region R of FIG. 3.

FIG. 5 is an enlarged plan view illustrating an enlarged ring-shaped region R (hereinafter referred to as the "ring region R") provided with the first receiving coil 15 on the first board 30 (the first layer 30A and the second layer 30B) of the stator 3 illustrated in FIG. 3. The ring region R is a virtual region (area) in which the first receiving coil 15 can be placed, as indicated by chain double-dashed lines in FIGS. 3 and 5, and it is not that the ring region R is divided by something. The coil pattern (form) of the first receiving coil 15 is described in detail below.

As illustrated in FIG. 5, the ring region R is broadly divided into a coil region Rc that is provided with the first receiving coil 15, and an opening region Ro (a dotted region of FIG. 5) that is not provided with the first receiving coil 15. The opening region Ro is used as a region for routing the signal wires 21L, 22L, and 25L of the coils 21, 22, and 25 provided radially inward of the first receiving coil 15, that is, the signal wires 21L, 22L, and 25L of three systems. In the following, the coils 21, 22, and 25 provided radially inward of the first receiving coil 15 are also collectively referred to as the "inner coils 26," and the signal wires 21L, 22L, and 25L of the coils 21, 22, and 25 are also collectively referred to as the "signal wires 26L." The signal wires 26L are signal wires that pass radially in the opening region Ro.

As described above, in the embodiment, the first receiving coil 15, which is one of the C-shaped coils, is provided in the C-shaped region excluding a part of the ring region R in the circumferential direction. In other words, in the embodiment, the coil region Rc of the first receiving coil 15 forms one of the above-mentioned "C-shaped regions," and the opening region Ro of the first receiving coil 15 forms one of the above-mentioned "parts of the regions." Moreover, the ring region R of the embodiment is provided with one opening region Ro.

The circumferential length of the coil region Rc is preferably set to be greater than the circumferential length of the opening region Ro. In the embodiment, the circumferential length of the opening region Ro is set to be a short length that allows the signal wires 26L of the inner coils 26 to be routed, and the coil region Rc occupies the most part in the circumferential direction. The coil region Rc is set in this manner. Therefore, a wide coil area can be secured for the first receiving coil 15, so that the detection accuracy of the resolver 1 can be increased.

The first receiving coil 15 includes two portions, an outer portion 15a (a first outer portion) and an inner portion 15b (a first inner portion), which are provided in the coil region Rc, are extended in the circumferential direction of the rotary shaft C, and form arc shapes.

The outer portion 15a is a portion formed of a conductor extended in the circumferential direction of the rotary shaft C, and is provided over substantially the entire coil region Rc in the circumferential direction. In the outer portion 15a, the conductor is routed in the one direction in the circumferential direction. The outer portion 15a formed of the conductor including four conductors extended in the clockwise direction is exemplified here. Note that in FIG. 5, thick arrows indicate the direction in which the conductor is routed, which translates to the direction of flow of current. Moreover, in FIG. 5, arrows drawn on the conductor and arrows drawn on thin solid lines linking through-holes 15d provided in the layers 30A and 30B indicate the direction of flow of current. Note that an output signal of the first receiving coil 15 is an alternating current signal as described above, so that the direction of flow of current is at a certain point in time, and current flows also in an opposite direction.

The inner portion 15b is a portion that is provided radially inward of the outer portion 15a, and formed of the conductor extended in the circumferential direction of the rotary shaft C. The inner portion 15b is provided over substantially entire coil region Rc in the circumferential direction, as in the outer portion 15a. In the inner portion 15b, the conductor is routed in the other direction in the circumferential direction (a direction opposite to the conductor forming the outer portion 15a). The inner portion 15b formed of the conductor including four conductors extended in the counterclockwise direction is exemplified here.

The inner portion 15b is provided with an air gap H in between with the outer portion 15a. The air gap H is provided, facing the air gap G of the first transmission coil 14 in the axial direction, in such a manner as to overlap the air gap G of the first transmission coil 14 in the axial direction. The radial width of the air gap H of the first receiving coil 15 is set to be a width greater than at least the first dimension A, the width allowing generating magnetic flux in the air gap H while securing as many the turns of the first receiving coil 15 as possible, as in the air gap G of the first transmission coil 14.

The outer portion 15a and the inner portion 15b are continuously provided via a pair of connection portions 15c. Each of the connection portions 15c is a portion that connects circumferential ends of the outer portion 15a and the inner portion 15b, and is formed of a plurality of conductors extending along the radial direction. The plurality of conductors connects the conductors forming the outer portion 15a and the inner portion 15b to each other to electrically connect the outer portion 15a and the inner portion 15b.

Note that in the embodiment, as described above, the opening region Ro is set to be a narrow width that allows the signal wires 26L to be routed, and each of the outer portion 15a and the inner portion 15b is provided over substantially the entire coil region Rc in the circumferential direction. Hence, the pair of connection portions 15c is placed in such a manner as to face each other across the opening region Ro.

In this manner, the first receiving coil 15 forms an arc shape having two arc-shaped portions (that is, the outer portion 15a and the inner portion 15b) spaced apart with the air gap H therebetween, the air gap H facing the air gap G of the first transmission coil 14 in the axial direction. Moreover, the directions of flow of current in the conductors forming the outer portion 15a and the inner portion 15b of the first receiving coil 15 are different from each other. Consequently, when magnetic flux is generated in the air gap G of the first transmission coil 14, the magnetic flux links in the air gap H of the first receiving coil 15 to generate an induced voltage in the first receiving coil 15. The induced voltage is sent as an output voltage to the control device 2, and used to calculate the angle of rotation.

Moreover, in the embodiment, as described above, the circumferential length of the coil region Rc is set to be greater than the circumferential length of the opening region Ro. Moreover, each of the outer portion 15a and the inner portion 15b of the first receiving coil 15 is provided over substantially the entire coil region Rc in the circumferential direction. In other words, the circumferential lengths of the outer portion 15a and the inner portion 15b of the first receiving coil 15 are set to be greater than the circumferential length of the opening region Ro. Consequently, a wide coil area can be secured for the first receiving coil 15. Hence, the output voltage of the first receiving coil 15 can be increased, which in turn contributes to an increase in the detection accuracy of the resolver 1.

In the first receiving coil 15 of the embodiment, the conductor is continuously routed in a single stroke manner to form the outer portion 15a, the inner portion 15b, and the connection portions 15c on each of the layers 30A and 30B. Moreover, the first receiving coils 15 on the layers 30A and 30B are electrically connected via the through-hole 15d to continuously provide the outer portion 15a, the inner portion 15b, and the connection portions 15c on the each of the layers 30A and 30B.

More specifically, the conductor to form the first receiving coil 15 is routed on the first layer 30A in such a manner as to draw an arc in the clockwise direction, starting on the radially outer side. Consequently, a part of the outer portion 15a of the first layer 30A is formed. The conductor is then routed in such a manner as to cross the air gap H radially inward and folded back, near the opening region Ro (the upper part of the opening region Ro in FIG. 5), as one of the pair of connection portions 15c. The conductor is subsequently routed in such a manner as to draw an arc in the counterclockwise direction at the closest position to the rotary shaft C in the coil region Rc. Consequently, a part of the inner portion 15b of the first layer 30A is formed.

The conductor is then routed in such a manner as to cross the air gap H radially outward and folded back, near the opening region Ro (the lower part of the opening region Ro in FIG. 5), as the other of the pair of connection portions 15c. The conductor is then routed on the radially inner side relative to the conductor of the outer portion 15a that has been routed earlier, in such a manner as to draw an arc in the clockwise direction. The conductor is subsequently routed in the order of the connection portion 15c and the inner portion 15b in a similar procedure, and continues being routed in a spiral fashion in a direction that narrows the air gap H. Consequently, the outer portion 15a, the inner portion 15b, and the connection portions 15c of the first layer 30A are formed. In other words, the first receiving coil 15 of the first layer 30A is formed.

The conductor, which has formed the first receiving coil 15 of the first layer 30A, is then routed on the second layer 30B via the through-hole 15d located in the lower part of the opening region Ro, and routed, reversing the above procedure. In other words, the conductor is routed in such a manner as to draw an arc in the clockwise direction, starting near a radially middle portion of the coil region Rc, forms the connection portion 15c that crosses the upper part of the opening region Ro radially inward, is folded back, and routed in such a manner as to draw an arc in the counter-clockwise direction with the air gap H provided. The conductor is then routed outward in the coil region Rc (in other words, radially outward in the outer portion 15a, and radially inward in the inner portion 15b) in a spiral fashion. Consequently, the outer portion 15a, the inner portion 15b, and the connection portions 15c of the second layer 30B are formed. Note that the plurality of conductors forming the portions 15a, 15b, and 15c is routed, slightly spaced apart to prevent contact with each other.

[2. Operations and Effects]

(1) In the above-mentioned resolver 1, the first receiving coil 15 formed on the first board 30 of the stator 3 includes the outer portion 15a and the inner portion 15b, which are extended in the circumferential direction and form an arc shape. Consequently, the signal wires 26L of the inner coils 26 can be routed in the opening region Ro in which the outer portion 15a and the inner portion 15b are not present, in the ring region R in which the first receiving coil 15 is extended. Hence, it is possible to make use of the region radially inward of the first receiving coil 15 as the region in which the inner coils 26 are placed, without providing the first board 30 with a special configuration for routing the signal wires 26L.

(2) Moreover, in the above-mentioned resolver 1, each of the first layer 30A and the second layer 30B of the first board 30 is provided with the outer portion 15a and the inner portion 15b of the first receiving coil 15. Therefore, more turns of the first receiving coil 15 can be secured. Hence, a higher output voltage can be obtained from the first receiving coil 15. Therefore, the detection accuracy of the angle of rotation of the resolver 1 can be increased. Moreover, the signal wires 26L of the inner coils 26 can be drawn out from the opening regions Ro of the first layer 30A and the second layer 30B. Therefore, the routing of the signal wires 26L can be simplified further.

(3) Moreover, in the above-mentioned resolver 1, the second coil group 20 is provided radially inward of the first coil group 10, and the second exciting coils 21 and 22 and the second receiving coil 25 of the second coil group 20 are provided as the "electric elements" described in the claims. In this manner, in the above-mentioned resolver 1, the plurality of coil groups 10 and 20 forming a multi-speed resolver can be placed next to each other in the radial direction. Therefore, a reduction in the size of the resolver 1 can be promoted.

(4) Furthermore, in the above-mentioned resolver 1, the circumferential lengths of the outer portion 15a and the inner portion 15b of the first receiving coil 15 are set to be greater than the circumferential length of the opening region Ro. Consequently, a wide coil area can be secured for the first receiving coil 15, which in turn an increase in the detection accuracy of the resolver 1 can be promoted.

(5) In addition, in the above-mentioned resolver 1, a positive connecting wire 26La of the signal wire 26L of the inner coil 26 is provided on the first layer 30A, and a negative connecting wire 26Lb on the second layer 30B. Consequently, a gap between the positive connecting wire 26La and the negative connecting wire 26Lb through which current flows in different directions from each other can be narrowed. Hence, it is possible to prevent generation of leakage flux and linkage of leakage flux in the gap. In addition, the positive connecting wire 26La and the negative connecting wire 26Lb are routed parallel on the layers 30A and 30B, so that leakage flux can be generated in a different direction from the axial direction. Hence, it is possible to prevent the leakage flus from influencing the first coil group 10 provided radially outward of the inner coil 26.

In other words, according to the above-mentioned resolver 1, the following three effects can be realized without increasing the number of layers of the first board 30:

- To enable simple routing of the signal wire 26L of the inner coil 26
- To prevent generation of leakage flux caused in the gap between the positive connecting wire 26La and the negative connecting wire 26Lb of the signal wire 26L of the inner coil 26 and linkage of leakage flux in the gap
- To secure the number of turns of the first receiving coil 15

The reasons for the above are described in detail below, taking, as a comparative example, a case in which a known annular sheet coil is employed as the first receiving coil. Even if the annular sheet coil is employed as the first receiving coil as before, when the first board 30 includes the two layers, the first layer 30A and the second layer 30B, the receiving coil is provided only on the first layer 30A, so that the above first effect can be exerted. In other words, if the signal wires 26L of the inner coils 26 are routed on the second layer 30B, simple routing of the signal wires 26L of the inner coils 26 is possible without increasing the number of layers of the first board 30.

However, in this case, both of the positive connecting wire 26La and the negative connecting wire 26Lb of the signal wire 26L are routed on the second layer 30B. Consequently, the gap between the positive connecting wire 26La and the negative connecting wire 26Lb becomes relatively large due to the restrictions on the manufacture. Hence, leakage flux tends to be generated in the gap, and the leakage flux tends to link in the gap. Moreover, the first receiving coil is provided only on the first layer 30A. Therefore, it is difficult to secure the number of turns of the first receiving coil, which may result in a reduction in the output voltage of the first receiving coil. In other words, in this case, the above second and third effects cannot be obtained.

In contrast, in the above-mentioned resolver 1, the first receiving coil 15 is formed on each of the first layer 30A and the second layer 30B. Therefore, the number of turns of the first receiving coil 15 can be secured. Hence, an increase in the output voltage of the first receiving coil 15 is promoted. Moreover, the signal wires 26L of the inner coils 26 can be drawn out from the opening region Ro. Therefore, routing of the signal wires 26L can be simplified. In addition, the positive connecting wire 26La is routed on the first layer 30A, and the negative connecting wire 26Lb is routed on the second layer 30B. Therefore, the gap between the positive connecting wire 26La and the negative connecting wire 26Lb can be made relatively narrow. Hence, it is possible to prevent generation of leakage flux caused in the gap and linkage of the leakage flux in the gap. In other words, the three effects can be obtained as described above.

[3. Others]

The above-mentioned resolver 1 is an example, and is not limited to the above-mentioned configuration. In the above-mentioned resolver 1, the electric elements provided radially inward of the first receiving coil 15 are the second exciting coils 21 and 22 and the second receiving coil 25 of the second coil group 20. However, the electric elements may not be the coils forming the second coil group 20, and may be different electric elements from coils.

For example, the electric elements may be coils provided to a sensor having a different configuration from the resolver 1. Moreover, the electric elements may be coils of a motor using sheet coils. Alternatively, the electric elements may be circuit wiring of an electronic component (such as an IC) mounted on the first board 30. Note that the "electric elements" described in the claims are simply required to electrically connect to an external control device provided at a position different from at least the stator 3 and the rotor 4, and the "external control device" described in the claims may not be the control device 2.

In the above-mentioned resolver 1, the case is exemplified in which the first exciting coils 11 and 12 and the first detecting coil 13, which have the multiplication factor of angle of nX, and the second exciting coils 21 and 22 and the second detecting coil 23, which have the multiplication factor of angle of 1X, are provided. However, it is simply required that the first exciting coils 11 and 12 and the first detecting coil 13 have a different multiplication factor of angle from the second exciting coils 21 and 22 and the second detecting coil 23, and are not limited to the above. The resolver 1 may not be a two-phase excitation/single-phase output resolver, and may not be a modulated wave resolver.

Moreover, in the above-mentioned resolver 1, the first receiving coil 15 is provided radially inward of the first exciting coils 11 and 12. However, the position of the first receiving coil 15 in the radial direction is not limited to the above. The first receiving coil 15 may be provided, for example, radially outward of the first exciting coils 11 and 12.

In the above-mentioned resolver 1, the case is exemplified in which one first receiving coil 15 is provided on the first board 30. However, a plurality of the first receiving coils 15 may be provided on the first board 30. For example, a plurality of the first receiving coils 15 spaced apart from one another in the circumferential direction may be provided in the ring region R on the first board 30. In this case, a plurality of the opening regions Ro can be formed in the ring region R.

Moreover, the first receiving coil 15 may not have the C shape in which the outer portion 15a and the inner portion 15b occupy the most of the ring region R in the circumferential direction. In other words, the outer portion 15a and the inner portion 15b of the first receiving coil 15 are simply required to have at least an arc shape that does not extend over the entire ring region R in the circumferential direction. The outer portion 15a and the inner portion 15b of the first receiving coil 15 may have a semicircular arc shape, or a quarter-circular arc shape. Moreover, the circumferential length of the opening region Ro may be greater than the circumferential length of the coil region Rc.

The first board 30 may not have the two-layer structure including the first layer 30A and the second layer 30B. Similarly, the second board 40 may not have the two-layer structure including the first layer 40A and the second layer 40B. The signal wires 26L of the inner coils 26 may be provided only on the first layer 30A of the first board 30, or only on the second layer 30B. An apparatus to which the resolver 1 is applied may not be a servo motor.

DESCRIPTION OF REFERENCE SIGNS

1 Resolver
2 Control device (external control device)
3 Stator
4 Rotor
11 First sine exciting coil (first exciting coil)
12 First cosine exciting coil (first exciting coil)
13 First detecting coil
14 First transmission coil (second transformer coil)
14a Outer portion (second outer portion)
14b Inner portion (second inner portion)
15 First receiving coil (first transformer coil)
15a Outer portion (first outer portion)
15b Inner portion (first inner portion)
21 Second sine exciting coil (second exciting coil, electric element)
22 Second cosine exciting coil (second exciting coil, electric element)
23 Second detecting coil
24 Second transmission coil (fourth transformer coil)
25 Second receiving coil (third transformer coil, electric element)
26 Inner coil (electric element)
21L, 22L, 25L, 26L Signal wire
21La, 22La, 25La, 26La Positive connecting wire
21Lb, 22Lb, 25Lb, and 26Lb Negative connecting wire
30 First board
30A First layer
30B Second layer
40 Second board
C Rotary shaft
G Air gap (second air gap)
H Air gap (first air gap)
R Ring region (ring-shaped region)
Ro Opening region

The invention claimed is:

1. A resolver that detects an angle of rotation of a rotor relative to a stator, wherein
the stator includes:
a first exciting coil provided on a sheet-like first board; and
a first transformer coil provided on the first board,
the rotor includes:
a first detecting coil provided on a sheet-like second board, facing the first exciting coil in a rotary shaft direction; and
a second transformer coil provided on the second board, connected to the first detecting coil and facing the first transformer coil in the rotary shaft direction,
the first board is provided with electric elements placed around a rotary shaft and inward of the first transformer coil, and signal wires connecting the electric elements and an external control device,
the first transformer coil includes:
a first outer portion that is extended in a circumferential direction of the rotary shaft to form an arc shape; and a first inner portion that forms an arc shape extended in the circumferential direction and that is provided continuously with the first outer portion around the rotary shaft and inward of the first outer portion, with a first air gap in between, the second transformer coil includes:
a second outer portion that forms a ring shape closed in the circumferential direction; and
a second inner portion that is connected to the second outer portion to form a ring shape closed in the circumferential direction and that is provided around the rotary shaft and inward of the second outer portion, with a second air gap in between, the first air gap and the second air gap are provided, facing each other in the rotary shaft direction, and the signal wires are routed in an opening region in which the first outer portion and the first inner portion are not present, in a ring-shaped region in which the first transformer coil is extended.

2. The resolver according to claim 1, wherein
the first board includes a first and a second layer stacked in the rotary shaft direction, and
the first outer portion and the first inner portion are provided on each of the first and second layers.

3. The resolver according to claim 2, wherein
the stator includes:
a second exciting coil that is provided on the first board and has a different multiplication factor of angle from the first exciting coil; and
a third transformer coil provided on the first board,
the rotor includes:
a second detecting coil provided on the second board, facing the second exciting coil in the rotary shaft direction; and
a fourth transformer coil provided on the second board, connected to the second detecting coil and facing the third transformer coil in the rotary shaft direction, and
the electric elements are the second exciting coil and the third transformer coil.

4. The resolver according to claim 3, wherein
one opening region is formed in the ring-shaped region, and
lengths in the circumferential direction of the first outer portion and the first inner portion are greater than a length in the circumferential direction of the opening region.

5. The resolver according to claim 4, wherein
among the signal wires, a positive connecting wire to be connected to a positive side of the external control device is routed on one of the first layer and the second layer, and
among the signal wires, a negative connecting wire to be connected to a negative side of the external control device is routed on the other of the first layer and the second layer.

6. A servo motor comprising the resolver according to claim 1.

* * * * *